United States Patent
Ali-Ahmad

(10) Patent No.: US 9,337,991 B2
(45) Date of Patent: May 10, 2016

(54) WIRELESS COMMUNICATION UNIT, RADIO FREQUENCY MODULE AND METHOD THEREFOR

(71) Applicant: MediaTek Singapore Pte. Ltd., Singapore (SG)

(72) Inventor: Walid Youssef Ali-Ahmad, Beirut (LB)

(73) Assignee: Mediatek Singapore Pte. Ltd., Solaris (SG)

( * ) Notice: Subject to any disclaimer, the term of this patent is extended or adjusted under 35 U.S.C. 154(b) by 95 days.

(21) Appl. No.: 14/252,786

(22) Filed: Apr. 15, 2014

(65) Prior Publication Data

US 2014/0313947 A1    Oct. 23, 2014

Related U.S. Application Data

(60) Provisional application No. 61/813,717, filed on Apr. 19, 2013.

(51) Int. Cl.
| | |
|---|---|
| *H04B 7/005* | (2006.01) |
| *H04B 3/21* | (2006.01) |
| *H04H 20/28* | (2008.01) |
| *H04L 5/18* | (2006.01) |

(52) U.S. Cl.
CPC .................................... *H04L 5/18* (2013.01)

(58) Field of Classification Search
CPC ....... H03H 11/04; H03H 11/344; H03H 7/01; H03H 7/0138; H03H 7/0115; H03H 7/0153; H03H 7/1758; H03H 7/1766; H03H 7/1775; H03H 9/547; H03H 9/6409; H03H 2007/013; H03H 2210/012; H04B 1/005; H04B 1/0057; H04B 1/006; H04B 1/0475; H04B 1/10; H04B 1/40; H04B 1/48; H04B 1/406; H04B 1/1036; H04B 15/00; H04L 5/14; H04L 5/18; H04L 7/04; H04L 25/08; H04L 27/2691; H03J 5/242; H04W 88/06; Y10T 428/24926
USPC ......... 370/272–297, 310–350, 437, 464–465, 370/487–488, 490, 497
See application file for complete search history.

(56) References Cited

U.S. PATENT DOCUMENTS

| | | | | | |
|---|---|---|---|---|---|
| 5,963,856 | A | * | 10/1999 | Kim ....................... | H03D 7/161 455/285 |
| 6,952,594 | B2 | * | 10/2005 | Hendin .................. | H04B 1/005 455/302 |
| 7,212,789 | B2 | * | 5/2007 | Kuffner ................... | H01P 1/15 333/124 |

(Continued)

OTHER PUBLICATIONS

Onzuka, Saw Duplexers without lamda/4 Phase Shifter for PDC Cellular Phone Systems, pp. 2101-2104, 2003 IEEE Ultrasonics Symposium.

(Continued)

*Primary Examiner* — Tri H Phan
(74) *Attorney, Agent, or Firm* — Optimus Patents US, LLC

(57) ABSTRACT

A wireless communication unit includes at least one antenna port; a transmitter and a receiver operably coupled to the at least one antenna port via a duplexer; wherein the duplexer includes a dynamically reconfigurable phase shift network that includes: at least one tunable radio frequency (RF) component; and at least one switch operably coupled to the tunable RF component and controllable to reconfigure the dynamically reconfigurable phase shift network to selectively support both normal and reverse duplexer modes of operation for RF signals passing there through.

20 Claims, 7 Drawing Sheets

(56) References Cited

U.S. PATENT DOCUMENTS

| | | | | |
|---|---|---|---|---|
| 7,446,629 B2* | 11/2008 | Nakamura | ........... | H03H 9/0038 |
| | | | | 333/133 |
| 7,825,745 B1 | 11/2010 | Gavin | | |
| 8,130,054 B1* | 3/2012 | Martin | ............. | H01P 1/20 |
| | | | | 333/1.1 |
| 8,229,366 B2* | 7/2012 | Simon | ............. | H04B 1/52 |
| | | | | 455/120 |
| 8,248,302 B2* | 8/2012 | Tsai | ................ | H01P 1/18 |
| | | | | 333/117 |
| 9,042,275 B2* | 5/2015 | Bauder | ............ | H03H 7/48 |
| | | | | 370/277 |
| 9,048,805 B2* | 6/2015 | Granger-Jones | ....... | H04B 1/525 |
| 9,083,518 B2* | 7/2015 | Bauder | ............ | H03H 7/48 |
| 2002/0183013 A1* | 12/2002 | Auckland | ............. | H01Q 1/243 |
| | | | | 455/73 |
| 2003/0176174 A1* | 9/2003 | Seppinen | ............. | H04B 17/21 |
| | | | | 455/226.1 |
| 2004/0127178 A1 | 7/2004 | Kuffner | | |
| 2006/0229030 A1 | 10/2006 | Simon | | |
| 2007/0024393 A1 | 2/2007 | Forse | | |
| 2013/0083703 A1* | 4/2013 | Granger-Jones | ....... | H04B 1/525 |
| | | | | 370/277 |
| 2013/0201880 A1* | 8/2013 | Bauder | ............ | H03H 7/48 |
| | | | | 370/277 |
| 2013/0201882 A1* | 8/2013 | Bauder | ............ | H03H 7/48 |
| | | | | 370/277 |
| 2015/0087246 A1* | 3/2015 | Khlat | ................ | H04B 1/401 |
| | | | | 455/77 |

OTHER PUBLICATIONS

Dong, Design of Miniaturized RF SAW Duplexer Package, IEEE Transactions on Ultrasonics, Ferroelectrics, and Frequency Control, vol. 51, No. 7, pp. 849-858, Jul. 2004.

* cited by examiner

WIRELESS COMMUNICATION UNIT, RADIO FREQUENCY MODULE AND METHOD THEREFOR

CROSS REFERENCE TO RELATED APPLICATIONS

This application claims the benefit of U.S. provisional application No. 61/813,717, filed on Apr. 19, 2013 and incorporated herein by reference.

BACKGROUND

The field of this invention relates generally to radio frequency (RF) modules for wireless communication units capable of reconfigurable phase shift combining and more particularly to RF transceiver modules comprising a reconfigurable duplexer.

Wireless communication units, e.g. portable radios, telephones, etc., are conventionally supported operation in a single radio frequency (RF) band, i.e. the operational band employed by the communication system. However, due to the rapid growth of mobile communications, there has been a comparable increase in the amount of spectrum that is required to support the various radio frequency standards, systems and services that are now available to mobile users. Furthermore, as radio frequency (RF) communication systems have evolved, there has been a recent trend for mobile communication devices to support communications in a plurality of RF bands, for example to support communications across a plurality of communication standards or geographical regions. Currently, a typical transceiver adapted to support a range of communications within, for example, a $3^{rd}$ generation partnership project (3GPP™), may be required to support more than ten distinct frequency bands.

One approach to supporting a wide frequency range that covers many frequency bands or communication standards in a wireless communication unit is that many parallel transceiver circuits are required to be physically located within the wireless communication unit and/or one or more of the parallel transceiver circuits needs to be tunable to operate across multiple frequency ranges. A number of adverse effects follow from either of these solutions within a wireless communication unit, including requiring higher quality radio frequency (RF) components that are less prone to interference, providing higher performance, consuming minimal amounts of silicon area or module board area, etc. Furthermore, these solutions also increase design complexity in order to meet performance requirements simultaneously over all the supported frequency bands.

A typical mobile (wireless) communication unit (sometimes referred to as a mobile subscriber unit (MS) in the context of cellular communications or a user equipment (UE) in terms of a $3^{rd}$ generation partnership project (3GPP™) communication system) contains an antenna often coupled to a duplex filter or antenna switch that provides some isolation between receive and transmit chains within the wireless communication unit. Of course these components in and around the antenna need to be able to operate across wide frequency ranges or be able to work in very close proximity with comparable/parallel RF circuits.

Furthermore, in such communications standards, the radio access network often employs technologies to facilitate more and easier communications, such as Frequency Division Duplexing (FDD) whereby a different set or band of receive frequencies and transmit frequencies are used for communications. Additionally, Time Division Duplexing (TDD) may be utilised, resulting in separate outward and return signals in the time domain. Furthermore, the access network may utilise different waveforms, signal modulation and coding schemes to differentiate between the different communications units.

A critical part of any FDD radio system is the front-end duplexer component, whose main function is to protect the receiver (Rx) from desensitization due to transmitter (Tx) noise emissions and transmitter power leakage impairments into the communication unit's receive frequency band. Such impairments may be due to one or more of: intermodulation, cross-modulation with out-of-band blocker, and receiver local oscillator phase noise reciprocal mixing.

In full-duplex radio systems, the receive frequency (frx), and transmit frequency (ftx), are typically different and they are separated by a specific 'duplex frequency' (fdpx)=frx−ftx.

One example of a known front end architecture 100, for example employing SAW based duplexers 150 is illustrated in FIG. 1. In SAW based duplexers, the concept of phase shifting is used to transform a low-Z notch at a stop band frequency in one duplexer branch into high-Z level at the antenna input in order not to minimize insertion loss at the passband frequency in the other duplexer branch. This provides isolation between both paths whilst connecting them at antenna side. In FIG. 1, therefore, an antenna 102 is operably coupled to an upper radio frequency path 104, say of a receiver, and a lower radio frequency path 106, say of a transmitter. A high-pass (HP) type phase shift network 108 is introduced into the Rx path, and is arranged to transform a low-Z notch at the transmit centre frequency into a high-Z level at the antenna input 102. Similarly, a low-pass (LP) type phase shift network 110 is introduced in the Tx path, and is arranged to transform the low-Z notch at the receive centre frequency into a high-Z level at antenna input. A high pass (HP) phase shift network 108 or low pass (LP) phase shift network 110 is used specifically in a duplexer branch depending on which side the desired passband frequency in that branch is relative to the stopband frequency. Frequency selectivity in the phase shifting networks also provides further attenuation in far-out stopband frequencies. The respective filter responses are performed by surface acoustic wave (SAW) filters 112, 114, which have ports 116, 118 that are matched to the respective receiver and transmitter chains.

Typically, in all second generation (2G) and third generation (3G) cellular FDD bands, frx>ftx and fdpx=frx−ftx is small percentage (typically <10%) of frx and ftx. However, in fourth generation (4G) communication frequency bands, there are some additional frequency bands that have been provided in which ftx>frx, which is denoted as a reverse duplex case 150 (and where fdpx<0).

In 3G/4G cellular systems, the number of FDD frequency bands that are supported increases depending on the number of in-band and outbound roaming bands that are required. In addition, the need to support multiple-input, multiple-output (MIMO) communications can add more stress on the RF front end complexity. Each of these performance requirements and associated technical complexities and corresponding circuits/components effectively limits the number of duplexers that can be supported in a single radio platform. Compacting the number of these duplexers without impacting performance is highly desirable because of the direct impact on radio frequency (RF) front-end solution size and cost reduction A duplexer for wireless communication units uses two resonant structures that exhibit a bandpass frequency response centered at both the receive frequency band and transmit frequency band center frequencies. The center frequencies are typically located very close to each other and are connected at an antenna port occasionally through a phase combining network. The duplexer's receive frequency bandpass response helps to reject strong out-of-band blockers and minimize the known coexistence problem with signals from nearby communication units. The duplexer transmit bandpass response helps to suppress transmit out-of-band noise emissions, transmitter harmonic emissions, and reverse intermodulation of the transmit signal with interfering signal reaching the transmitter via the antenna.

A phase matching network ensures that each filter's impedance at the antenna port is exactly matched at its own passband and with an almost 'open' (i.e. exhibiting a high impedance (Z)) at the other side's (converse Rx/Tx) in filter stopband frequency. If the phase matching network is not 'open', a phase shifter is generally used to rotate the impedance of the phase matching network to an equivalent 'high Z'.

For 4G reverse duplexing cases (where ftx<frx), the order is reversed as far as the HP/LP phase shifting combiner topology. Therefore, a low-pass/high-pass (LP/HP) phase shifting combiner may be used instead, in order to connect to the respective Rx and Tx paths.

In a case of a tunable duplexer that requires the tuning over different cellular bands (e.g. covering at least LTE cellular bands in the 700-1000 MHz range) as well as being able to handle both normal and reverse duplex cases, it is not sufficient to tune the elements of a phase shifting network, such as phase shift networks 108, 110 of FIG. 1.

Thus, a need exists for an improved radio frequency frontend architecture that supports, for example, both normal and reverse duplexing in a cost-effective and manageable complexity manner.

SUMMARY

Accordingly, the invention seeks to mitigate, alleviate or eliminate one or more of the above mentioned disadvantages singly or in any combination. Aspects of the invention provide a wireless communication unit, a radio frequency module, and duplexer circuit therefor as described in the appended claims.

According to a first aspect of the invention, there is provided a wireless communication unit comprising at least one antenna port; a transmitter and a receiver operably coupled to the at least one antenna port via a duplexer; wherein the duplexer comprises a dynamically reconfigurable phase shift network that comprises: at least one tunable radio frequency (RF) component; and at least one switch operably coupled to the tunable RF component and controllable to reconfigure the dynamically reconfigurable phase shift network to selectively support both normal and reverse duplexer modes of operation for RF signals passing there through.

Thus, in one example, an ability to dynamically reconfigure (e.g. in a real-time manner) a transceiver RF circuit, e.g. a duplexer, by dynamically reconfiguring a phase of a signal output from the transmitter and/or a signal input to the receiver may be achieved, for example by selectively inserting one or more lumped element (L, C) components into a phase shift network. Furthermore, in this manner, a tunable phase shift network may be dynamically reconfigured by switching topology from a normal duplex operation to a reverse duplex operation.

According to an optional feature, the at least one switch may selectively reconfigure the tunable phase shift network based upon a frequency of operation in support of a normal or reverse duplexer mode of operation. In this manner, a tunable phase shift network in either or both of a transmitter and receiver can be readily re-configured by provision of at least two separate signal paths that are selectable via control of the at least one switch, which may be based upon a determined frequency of operation of the transmitter and receiver.

According to an optional feature, the at least one switch may comprise two switches operably coupled serially to respective inductances and configured to be closed to support a low-pass frequency mode of operation in either the transmitter or the receiver. According to an optional feature, the wireless communication unit may further comprise at least a tunable capacitance located in a parallel path to each of the at least two switches. A first tunable capacitance may be arranged to support a tunable high-pass frequency response mode of operation in either the transmitter or the receiver whereas a second tunable capacitance may be arranged to support a tunable low-pass frequency response in parallel with one of the respective inductances in the other of the receiver or transmitter. In this manner, the tunable capacitances as, for example, the sole lumped element component in a phase shift network, may be tuned in conjunction with a standard RF tunable component to effect the desired frequency and phase response.

According to an optional feature, the at least one switch may comprise at least two switches: a first switch of the at least two switches configured to couple first paths between the antenna port and the transmitter and the antenna port and the receiver to configure the transmitter and receiver for normal duplex mode of operation; and a second switch of the at least two switches configured to couple second paths between the antenna port and the transmitter and the antenna port and the receiver to configure the transmitter and receiver for reverse duplex mode of operation. In this manner, a switch or set of switches may be activated for normal duplex mode of operation and a second switch or second set of switches may be activated for reverse duplex mode of operation.

According to an optional feature, the at least one switch may comprise at least one of: at least one single-pole multiple-throw antenna switch, a multiple-throw multiple-pole antenna switch.

According to an optional feature, the reconfigurable phase shift network may comprise a tunable phase response that forms part of both: a transmitter phase shift network and a tunable transmit radio frequency (RF) component; and a receiver via a receiver phase shift network and a tunable receive RF component. According to an optional feature, apart of the tunable phase shift network comprises a lumped element portion and a portion that resides in the tunable RF component. According to an optional feature, the wireless communication unit may further comprise a controller operably coupled to the transmitter and receiver, wherein a tunable high-pass frequency response and a tunable low-pass frequency response may be controlled by the controller, configured to tune the first tunable capacitance in combination with a serially coupled tunable transmit radio frequency component, and the second tunable capacitance in combination with respective further serially coupled tunable receive radio frequency component. In this manner, fewer lumped element components may be used to implement a tunable phase shift network, as some of these components are incorporated into a modified tunable RF component.

According to an optional feature, at least one of the tunable RF components may comprise at least one from: a tunable band pass filter, a tunable notch filter.

According to a second aspect of the invention, there is provided a radio frequency module comprising a duplexer that comprises a dynamically reconfigurable phase shift network that comprises: at least one tunable radio frequency (RF) component; and at least one switch operably coupled to the tunable RF component and controllable to reconfigure the dynamically reconfigurable phase shift network to selectively support both normal and reverse duplexer modes of operation for RF signals passing there through.

According to a third aspect of the invention, there is provided a method of tuning a transceiver of a communication unit that comprises at least one antenna port; and a transmitter and a receiver operably coupled to at least one antenna port via a duplexer, wherein the duplexer comprises a dynamically reconfigurable phase shift network. The method comprises: determining a frequency mode of operation for both the transmitter and receiver; dynamically configuring at least one switch in at least one path operably coupling the at least one antenna port to the transmitter or receiver in accordance with the determined frequency mode of operation, tuning at least one tunable radio frequency (RF) component in each of the transmitter and receiver; and further tuning at least one further lumped element component, in at least one of the transmitter and receiver, in conjunction with at least one of the at least one tunable radio frequency component, thereby dynamically reconfigure a phase to be applied to a signal passing through the reconfigurable phase shift network to selectively support both normal and reverse duplexer modes of operation for RF signals passing there through.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Examples of the invention will be described in terms of a wireless communication unit, such as a user equipment, that comprises an antenna port operably coupling at least one transceiver to an antenna. However, it will be appreciated by a skilled artisan that the inventive concept herein described may be embodied in any type of wireless communication unit comprising a transceiver, such as a base station. Examples of the invention are described in terms of a wireless communication unit that is capable of reconfigurable phase shift combining and more particularly to RF transceiver modules comprising a reconfigurable (e.g. tunable) duplexer. In this manner, in implementing a reconfigurable duplexer, the duplexer can simplify the front end design and reduce the performance requirements of some RF components due to the ability to tune to the desired narrowband channel over a certain frequency band or multiple frequency bands. In some examples, the reconfigurable duplexer is able to cover both normal and reverse duplexing cases.

Furthermore, examples of the invention describe a wireless communication unit wireless communication unit comprising: a transmitter and a receiver; at least one antenna port; and a reconfigurable phase shift network operably coupling the at least one antenna port to the transmitter and receiver and arranged to dynamically reconfigure a phase of at least one from: a signal output from the transmitter, a signal input to the receiver.

Figure 1:
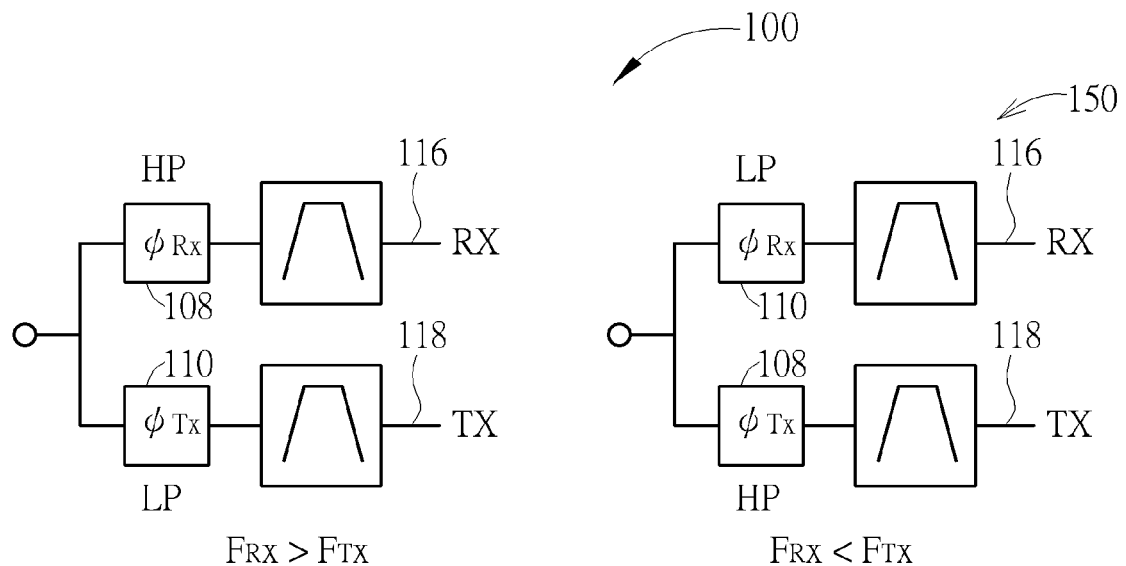
FIG. 1 illustrates a known front end architecture employing SAW filters and phase matching circuits.
Figure 1:
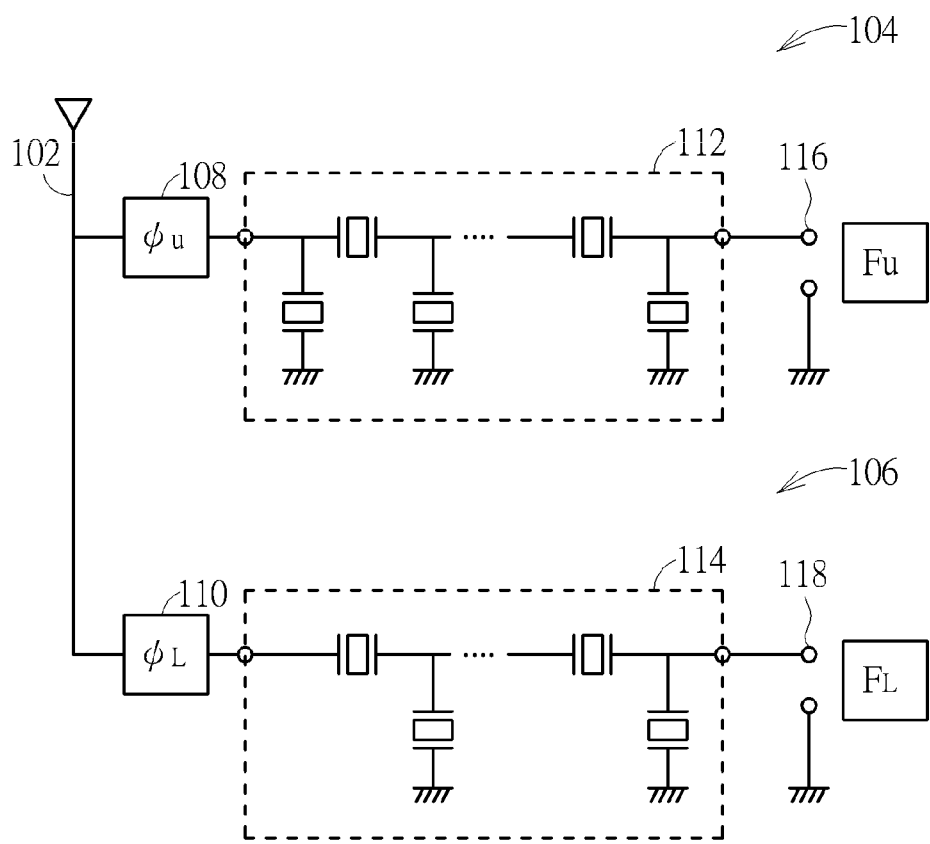
Figure 2:
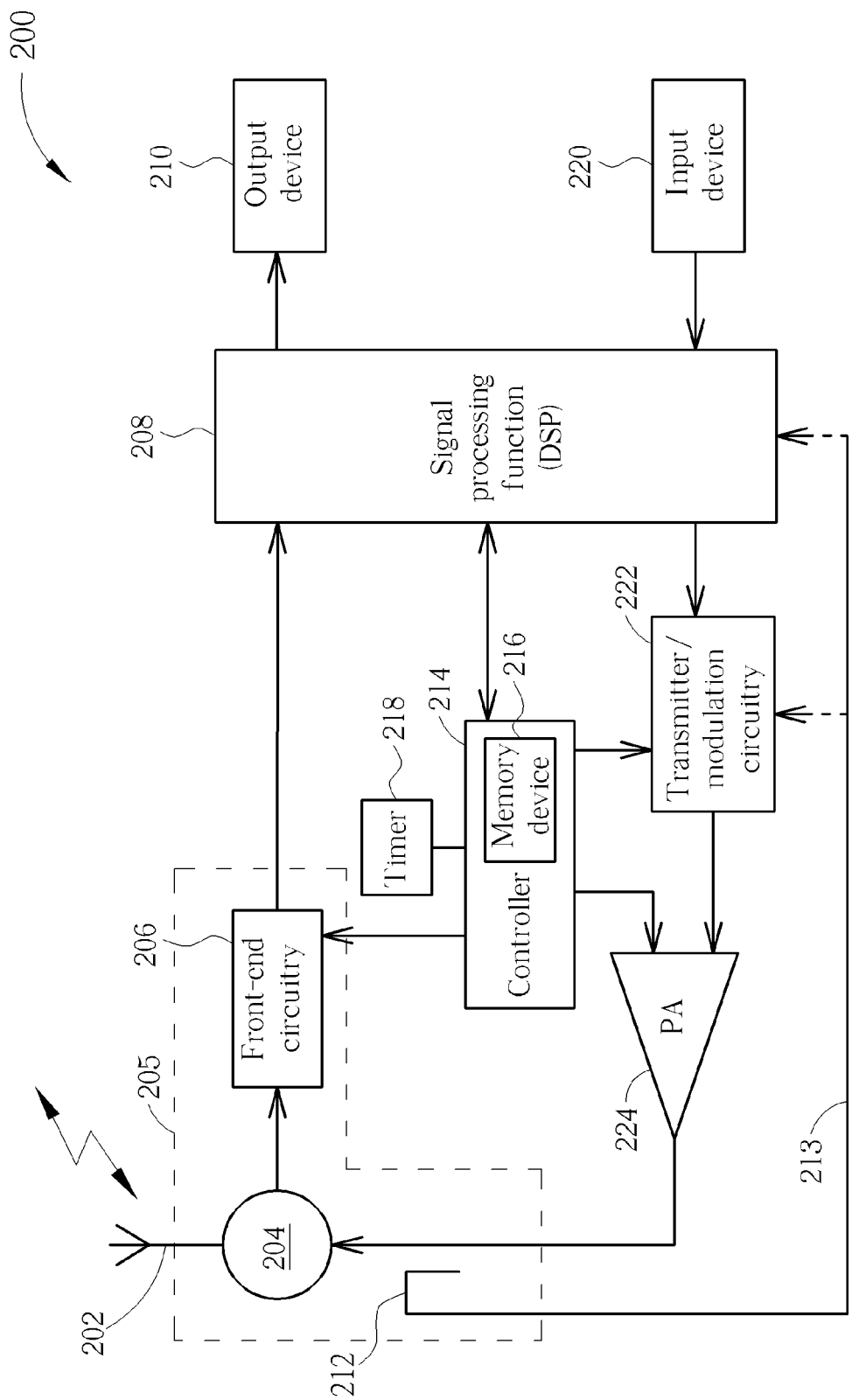
FIG. 2 illustrates an example of a wireless communication unit adapted to support example embodiments of the invention.

Referring first to FIG. 2, a block diagram of a wireless communication unit (sometimes referred to as a mobile subscriber unit (MS) in the context of cellular communications or a user equipment (UE) in terms of a $3^{rd}$ generation partnership project (3GPP™) communication system) is shown, in accordance with one example embodiment of the invention.

The wireless communication unit 200 contains a transceiver having an antenna 202 coupled to a reconfigured or reconfigurable duplexer 204. In one example, the reconfigurable duplexer 204 comprises a simple lumped component network arranged to perform a low-Z to high-Z transformation, for example using a quarter wavelength λ/4-transmission line equivalent J-inverter, followed by tunable RF components. The equivalent lumped element version of λ/4-transmission line is a π-type −90° phase shifter that can be implemented in a low-pass or high-pass topology, as illustrated below with respect to FIGS. 3-6.

The equations to calculate lumped element inductance 'L', capacitance 'C' values for a −90 deg phase shifting network, based on a desired band center frequency, $f_c$, are:

$$L = \frac{Z_0}{2\pi \cdot f_c};$$

$$C = \frac{1}{2\pi \cdot f_c \cdot Z_0}$$

Equaltion [1]

In one example, the lumped element reconfigurable duplexer 204 may be implemented using a typical π-type or T-type phase shift network, which comprises, for example, a fractional bandwidth (BW), $\Delta_{BW}=(f_u-f_l)/f_c$, equal to ~25%, defined based on nominal phase shift of −90°±15°.

In one example, the lumped element reconfigurable duplexer 204 is arranged to support a wide frequency range covering normal and reverse cellular duplex cases, for example the 700-100 MHz range, including LTE bands 17, 13, 20, and 8, as illustrated in Table 1 below:

TABLE 1

| Band | ftx (MHz) | frx (MHz) | fdpx (MHz) | Duplex Case |
|---|---|---|---|---|
| 17 | 704-716 | 734-746 | 30 | Normal |
| 13 | 777-787 | 746-756 | −31 | Reverse |
| 20 | 832-862 | 791-821 | −41 | Reverse |
| 8 | 880-915 | 925-960 | 45 | Normal |

Phase shift L, C lumped elements derived based on equation (1) are related by the resonance frequency, $f_c$, which is the center frequency of the chosen frequency range defined as:

$$f_c = \sqrt{f_{tx/rx,min} \cdot f_{tx/rx,max}} \qquad \text{Equation [2]}$$

In one example, $f_{min}$ and $f_{max}$ are chosen such that:

$$(f_{max} - f_{min})/f_c < 25\% \qquad \text{Equation [3]}$$

Referring back to FIG. 2, the receiver chain, as known in the art, includes receiver front-end circuitry 206 (effectively providing reception, filtering and intermediate or base-band frequency conversion). The front-end circuitry 206 is connected to a signal processing function 208. An output from the signal processing function 208 is provided to a suitable output device 210, such as a screen or flat panel display. The receiver chain also includes a controller 214 that maintains overall subscriber unit control. The controller 214 is also connected to the receiver front-end circuitry 206 and the signal processing function 208 (generally realised by a digital signal processor (DSP)). The controller 214 is also connected to a memory device 216 that selectively stores operating regimes, such as decoding/encoding functions, synchronisation patterns, code sequences, and the like. A timer 218 is operably coupled to the controller 214 to control the timing of operations (transmission or reception of time-dependent signals) within the wireless communication unit 200.

As regards the transmit chain, this essentially includes an input device 220, such as a keypad, coupled in series via signal processor function 208 through transmitter/modulation circuitry 222 and a power amplifier 224 to antenna 202. A coupler 212 is typically located between the power amplifier 224 and the antenna 202 to route a portion of the transmit signal output to the antenna 202 via feedback path 213 to baseband processing circuitry, for example located in either transmitter/modulation circuitry 222 or signal processor function 208. The transmitter/modulation circuitry 222 and the power amplifier 224 are operationally responsive to the controller 214.

As illustrated, a front end radio frequency module 205 may be used to house the various front end modules or components or circuits, such as in this example reconfigurable duplexer 204 and other RF components (not shown).

Figure 3:
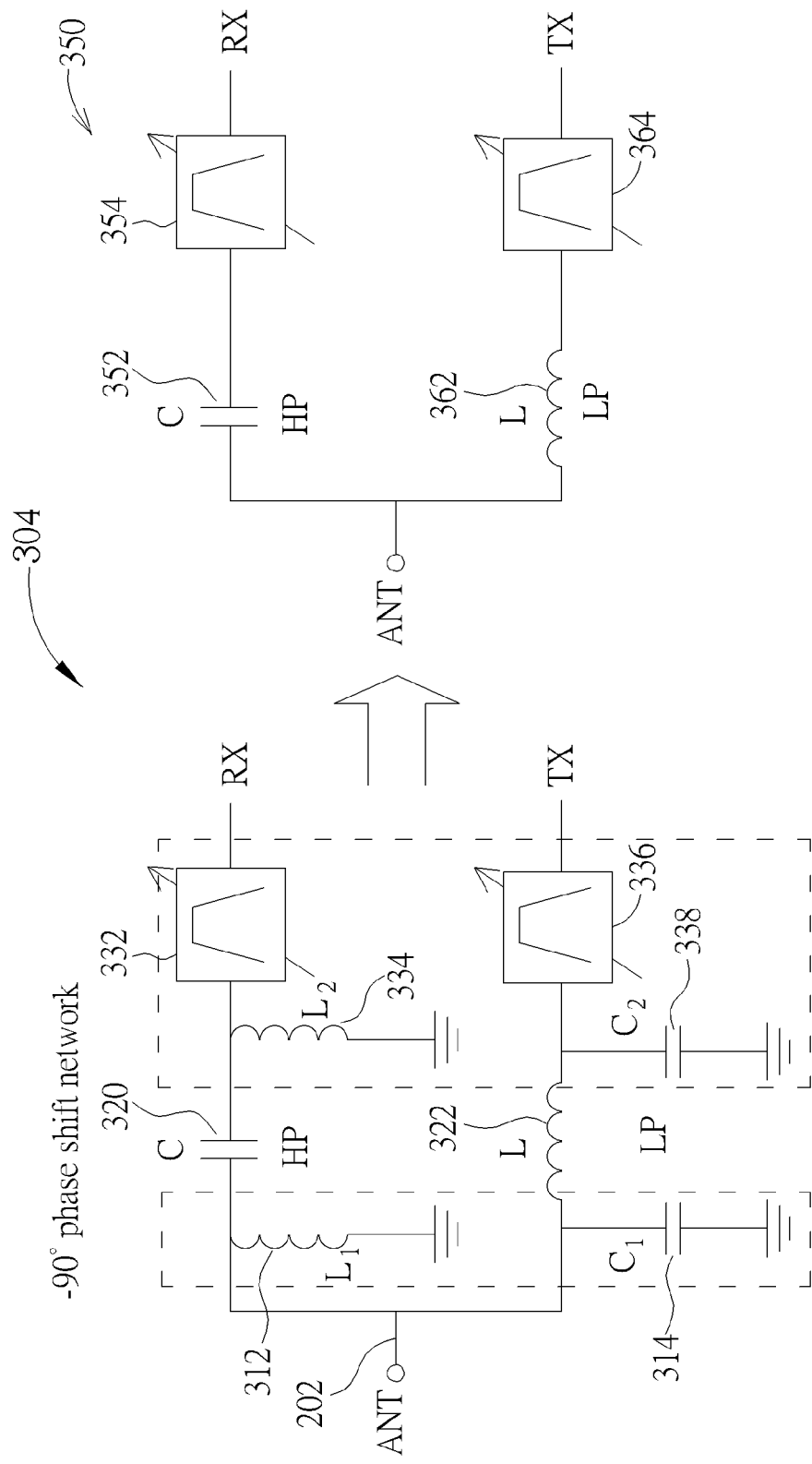
FIG. 3 illustrates a first example of a reconfigured duplex architecture of the wireless communication unit of FIG. 2.

Referring now to FIG. 3, a first example of a reconfigured tunable duplex architecture of the wireless communication unit of FIG. 2 is illustrated. The first example of a reconfigured duplexer 304 may be suitable for a conventional or a reverse duplexer design, as compared to being able to switch between both conventional duplexer and a reverse duplexer as described with reference to FIGS. 4-6. The reconfigured duplexer 304 comprises a simple lumped element component network, rather than a quarter wavelength λ/4-transmission line coupling an antenna (ANT) 202 to respective adjustable filters 332, 336. The lumped element component network comprises component values for inductances and capacitances that are arranged to perform a low-Z to high-Z transformation, thereby equating to a quarter wavelength λ/4-transmission line −90° phase shift. The illustrated lumped element component network is a π-type −90° phase shifter that can be implemented in a low-pass or high-pass topology, as illustrated.

The high pass topology, typically used for a receiver path, comprises a π-type −90° phase shifter with two inductance legs ($L_1$) 312 and ($L_2$) 334, with a capacitive bridge (C) 320, followed by the adjustable bandpass filter 332, which may be implemented as a SAW filter. The low pass topology, typically used for a transmitter path, also comprises a π-type −90° phase shifter with two capacitance legs ($C_1$) 314 and ($C_2$) 338, with an inductance bridge (L) 322, followed by the adjustable bandpass filter 336, which may be implemented as a SAW filter.

In accordance with example embodiments, and in order to minimize the number of components used in the phase shift combining network, it is proposed that inductance leg ($L_1$) 312 and capacitance leg ($C_1$) 314 will resonate each other around the design center frequency, while inductance leg ($L_2$) 334 and capacitance leg ($C_2$) 338 may be incorporated as part of the Rx and Tx tunable bandpass filter designs 332, 336, respectively. In this manner, one example implementation utilizes these design factors to employ a simplified phase shift combiner network design 350, which comprises solely a series (HP) capacitance (C) 352 followed by a modified adjustable bandpass filter 354, in the HP path, and similarly solely a series (LP) inductance 362 followed by a modified adjustable bandpass filter 364, in the LP path.

As would be appreciated, the example in FIG. 3 is ideally suited to implementation of a normal fixed duplexer design. In this case, a skilled artisan will appreciate that the high-pass and low-pass topologies can be swapped so that they can be configured for a reverse fixed duplexer design.

Figure 4:
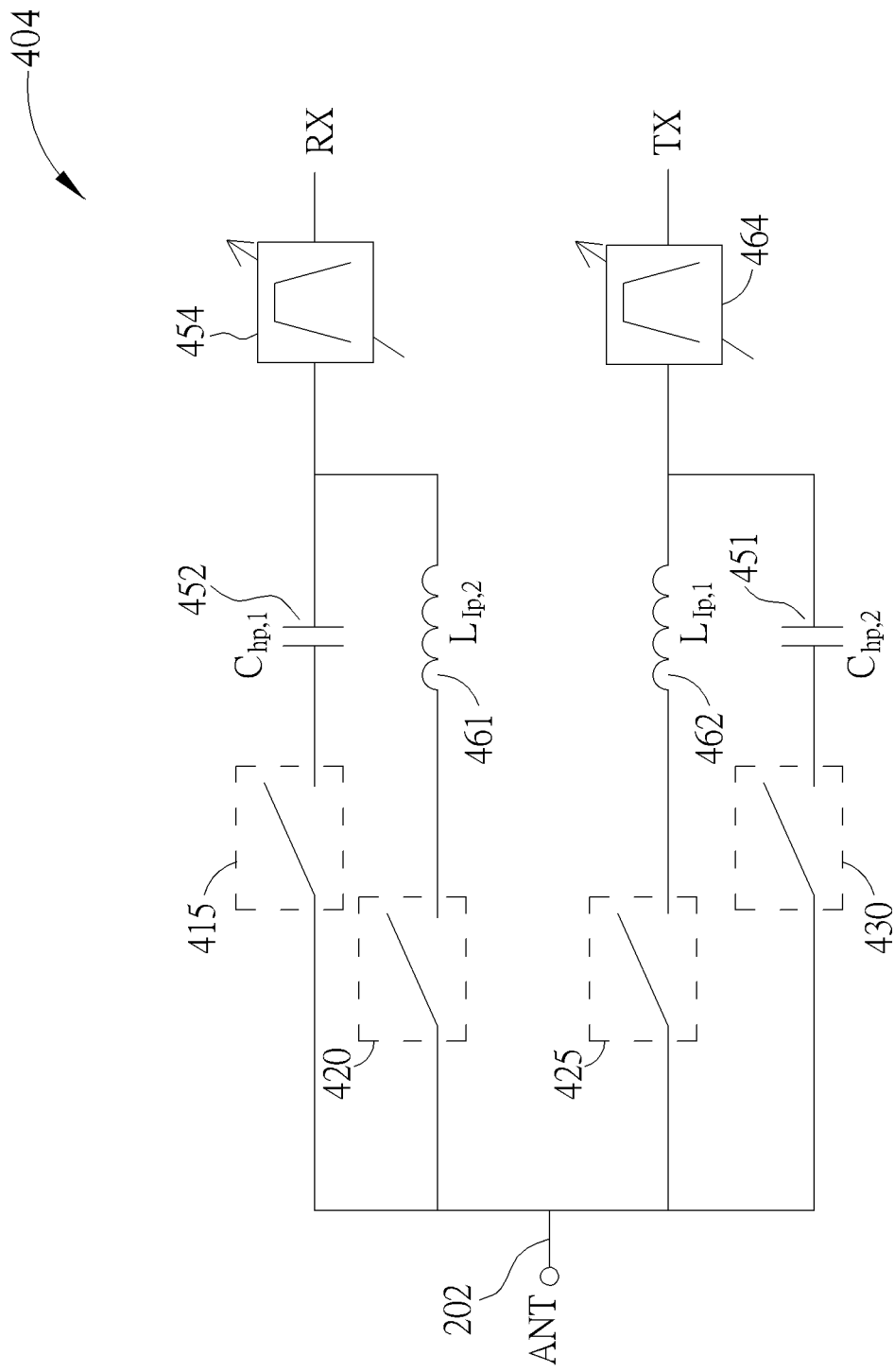
FIG. 4 illustrates a second example of a reconfigurable/tunable duplex architecture of the wireless communication unit of FIG. 2.

Referring now to FIG. 4, an example of a reconfigurable (e.g. tunable) duplexer 404 architecture of the wireless communication unit of FIG. 2 is illustrated. In this example, which may be perceived as an alternative or enhancement to the architecture of FIG. 3, and in order to handle reverse duplex case in a certain frequency range for example, reconfigurability of a phase shift network can be achieved through switching in and out certain lumped elements. For example, whilst referring back to FIG. 3, a high-pass phase shift network can be provided to a duplexer comprising a receive band-pass filter 454 in a receiver path via control of switch 415. In this path, the HP capacitance 352 of FIG. 3 is illustrated as HP capacitance ($C_{hp,\,1}$) 452 of FIG. 4. Advantageously, in order to support a reverse duplex case, switch 415 may be opened and a parallel switch 420 may be closed. The parallel switch 420 is coupled to low-pass inductance ($L_{lp,\,2}$) 461 (equating to LP inductance 362 of FIG. 3). Thereafter, the 90 deg. phase shift network at a LP frequency (namely achieved by low-pass inductance 461) passes the phase shifted signal to bandpass filter 454 in the receiver path. As duplexer 404 comprises an adjustable tunable receive band-pass filter, the duplexer 404 is able to be re-tuned to exhibit the required filtering characteristics of either a HP (normal) receiver path or a LP (reverse duplex) receiver path.

Similarly, and again whilst referring back to FIG. 3, a low-pass phase shift network can be provided to a duplexer 404 comprising a transmit band-pass filter 464 in a transmitter path via control of switch 425. In this path, the LP inductance 362 of FIG. 3 is illustrated as LP inductance ($L_{lp,\,1}$) 462 of FIG. 4. Advantageously, in order to support a reverse duplex case, switch 425 may be opened and a parallel switch 430 may be closed. The parallel switch 430 is coupled to high-pass capacitance ($C_{hp,\,2}$) 451 (equating to HP capacitance 352 of FIG. 3). Thereafter, the 90 deg. phase shift network at a HP frequency (namely achieved by high-pass capacitance 451) passes the phase shifted signal to transmit band-pass filter 464 in the receiver path. As duplexer 404 comprises an adjustable tunable transmit band-pass filter, the duplexer 404 is able to be re-tuned to exhibit the required filtering characteristics of either a LP (normal) transmitter path or a HP (reverse duplex) transmitter path.

Thus, in summary, by incorporation of parallel, selectable paths, in each of the receiver and transmitter paths, with the two parallel paths in each of the receiver and transmitter paths providing either a selectable (switchable) high-pass path and low-pass path. Hence, by closing of switches 415 and 425, the receiver path is coupled to $C_{hp,1}$, 452 and the transmitter path is coupled to $L_{lp,1}$ 462. Furthermore, and alternatively, closing of switches 420 and 430, the receiver path is coupled to $L_{lp,2}$ 461 and the transmitter path is coupled to $C_{hp,2}$, 451.

Although some examples of the invention have been illustrated in the figures with respect to use of single-pole single throw switches, it is envisaged that any number of single pole (or double pole) N-throw switches may be used, dependent for example on the number of transmit or receive paths being supported, the architecture employed or the wireless communication standards supported. For example in the illustrated example, four single pole, single throw switches are illustrated; whereas it is envisaged that in other examples two single pole double throw switches may be implemented, with the selected paths dependent upon whether a selected receiver path and corresponding transmitter path is operating in either a normal duplex mode of operation or a reverse duplex mode of operation, i.e. switching in a high-pass path for a receiver automatically switches out a low-pass path, and vice versa for the transmitter side.

Figure 5:
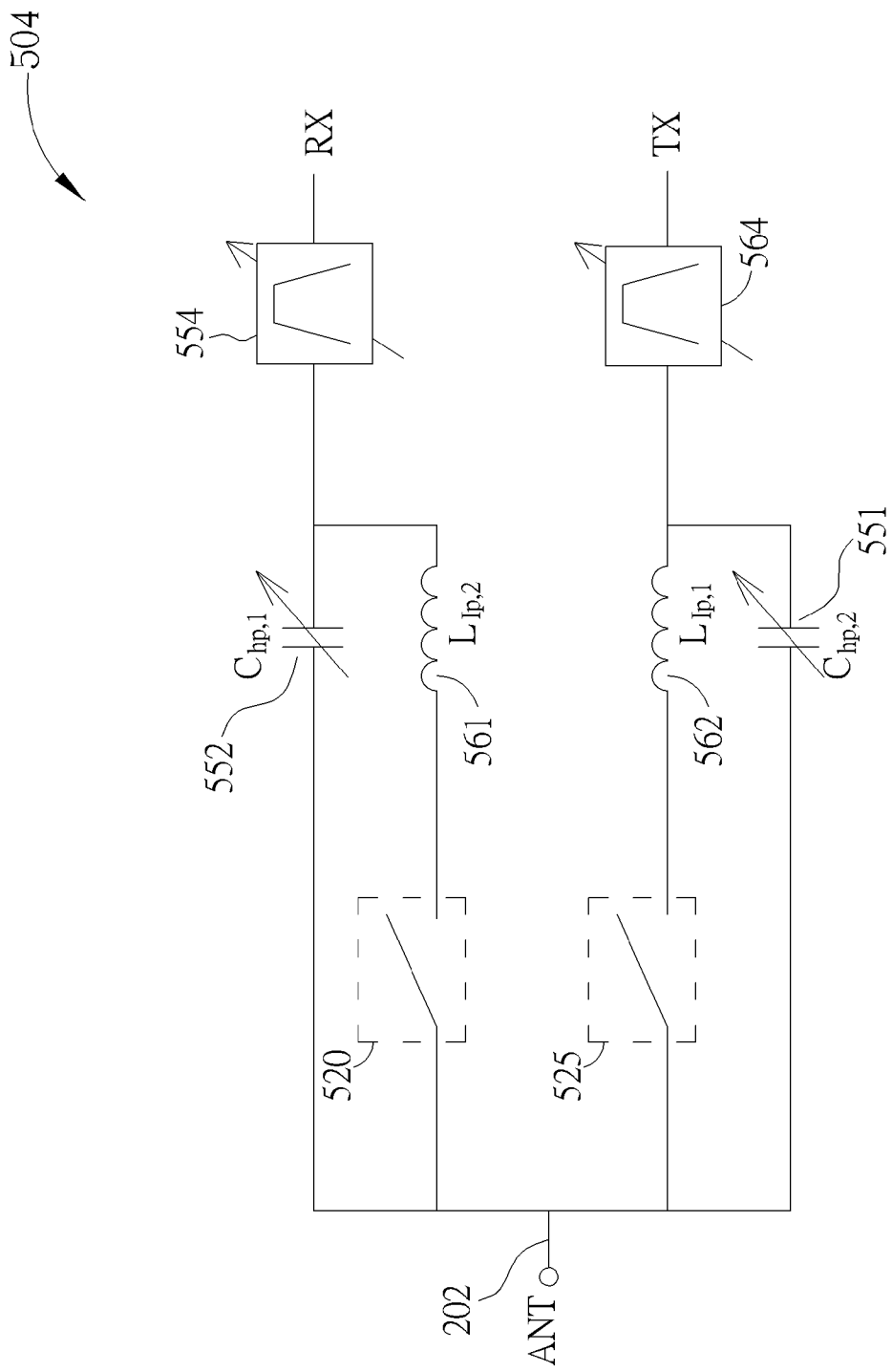
FIG. 5 illustrates a third example of a reconfigurable/tunable duplex architecture of the wireless communication unit of FIG. 2.
Figure 6:
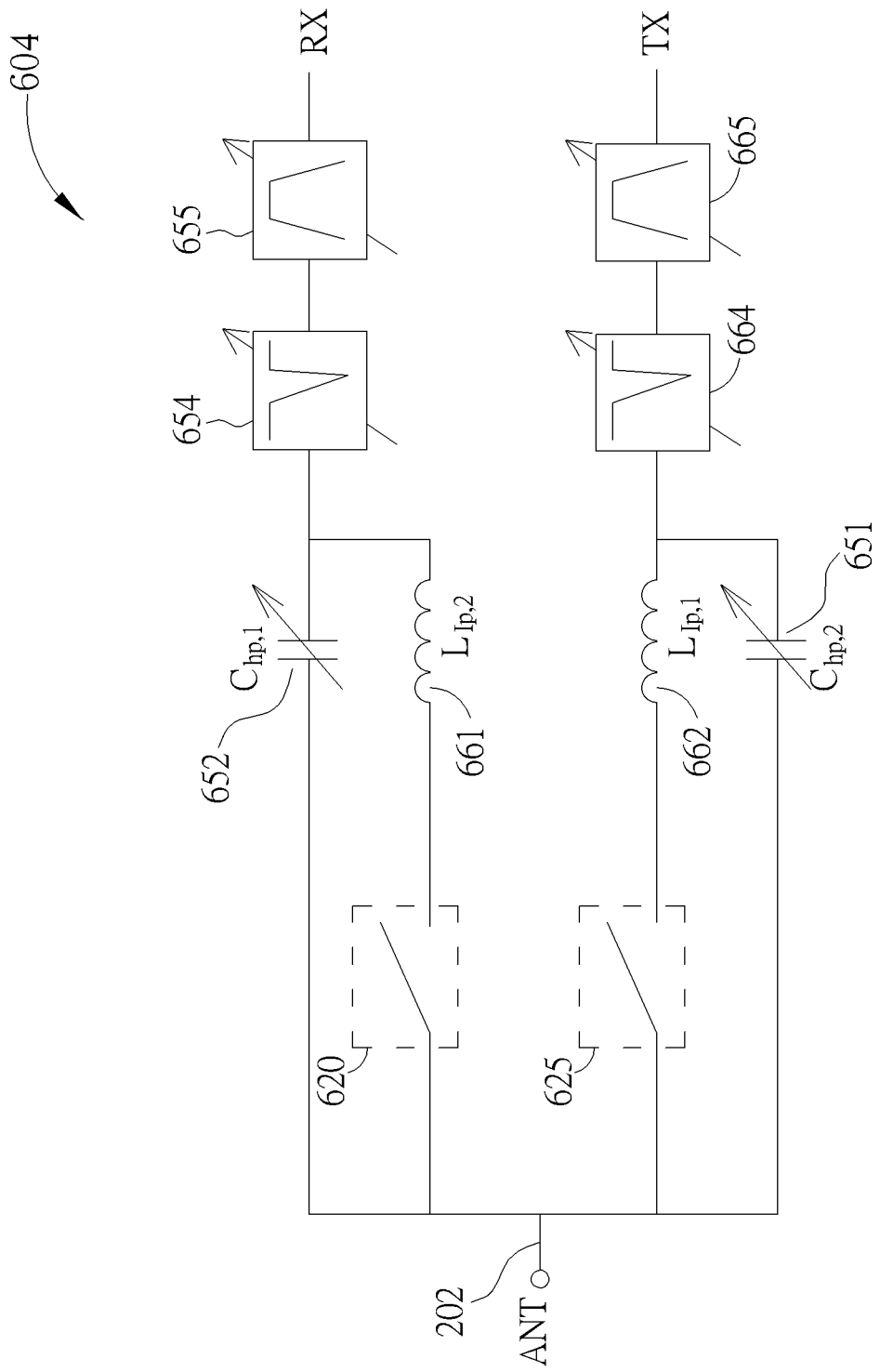
FIG. 6 illustrates a fourth example of a reconfigurable/tunable duplex architecture of the wireless communication unit of FIG. 2.

In one example, if a frequency range of the tunable duplexers is required such that the fractional BW covered is larger than 25%, then tunability of L, C elements in the phase shift (combiner) network may be employed. This example configuration 504 is illustrated in FIG. 5. In one example of using tunable L, C elements in the phase shift (combiner) network, a switch in series with a capacitor is implemented using a variable capacitor element that can be sized to result in a smallest $C_{min}$ which is needed in the case when the capacitor element 'C' needs to be switched out. In addition, a tunable capacitor ($C_{hp,2}$) 551 in parallel with an inductor ($L_{lp,1}$) 562 results in an equivalent tunable inductor (to inductance 462 of FIG. 4).

Therefore, FIG. 5 illustrates a further example of a reconfigurable (e.g. tunable) duplexer architecture 504 of the wireless communication unit of FIG. 2. Here, a high-pass phase shift network can be provided to a duplexer comprising a tunable receive band-pass filter 554 in a receiver path via tunable capacitor ($C_{hp,1}$) 552, with switch 520 'open'. Advantageously, in order to support a reverse duplex receiver case, switch 520 may be closed, thereby creating a parallel LC network with tunable capacitor 552 and low-pass inductance (Llp, 2) 561. Thereafter, the 90 deg. phase shift network at a LP frequency (namely achieved by parallel LC network with tunable capacitor 552 and low-pass inductance 561) passes the phase shifted signal to tunable receive band-pass filter 554 in the receiver path.

Similarly, a low-pass phase shift network can be provided to a duplexer comprising a tunable transmit band-pass filter 564 in a transmitter path via control, e.g. closing, of switch 525. In this path, the LP inductance 562 in parallel with a small high-pass variable (tunable) capacitance 551 supports a normal duplex case. Alternatively, switch 525 may be opened and the antenna path is solely coupled to high-pass variable (tunable) capacitance 551 to support a reverse duplex transmitter case. Thereafter, the 90 deg. phase shift network at a HP frequency (namely achieved by high-pass variable (tunable) capacitance 551) passes the phase shifted signal to tunable transmit band-pass filter 564 in the transmitter path.

In one example, say for a high-pass case, tuning a combination of both tunable receive band-pass filter 554 and either tunable capacitor 551 or tunable capacitor 552 (dependent upon a respective normal duplex mode or reverse duplex mode) is performed to ensure a desired phase shift and filter response. In an alternative example, say for a low-pass case, solely the tunable receive band-pass filter 554 may be able to be re-tuned to if the tunable capacitor 551 or tunable capacitor 552 in parallel with the switched in low-pass inductance has little effect on the frequency response.

In the previous examples, the tunable duplexers have been illustrated as comprising bandpass filters. However, and referring now to FIG. 6, a yet further example of a reconfigurable (e.g. tunable) duplex architecture 604 of the wireless communication unit of FIG. 2, whereby a tunable notch filter is cascaded with the tunable band pass filter to result in further transmit-receive isolation at specific offset frequency defined by the notch frequency.

In operation, a high-pass phase shift network can be provided to a duplexer comprising tunable receive band-pass filter 655 in a receiver path via tunable capacitor ($C_{hp,1}$) 652. Advantageously, in order to support a reverse duplex receiver case, switch 620 may be closed, thereby creating a parallel LC network with tunable capacitor 652 and low-pass inductance ($L_{lp,2}$) 661. Thereafter, the 90 deg. phase shift network at a LP frequency (namely achieved by parallel LC network with tunable capacitor 652 and low-pass inductance 661) passes the phase shifted signal to tunable receive band-pass filter 655 in the receiver path. In this example, the tunable receive band-pass filter 655 in the receiver path is supplemented with a tunable notch filter 654, with the notch arranged to be at the corresponding transmit centre frequency. In this manner, the tunable tunable receive band-pass filter 655 response may be designed in such way as to exhibit relaxed close-in stop band rejection characteristics.

Similarly, a low-pass phase shift network can be provided to a tunable transmit band-pass filter 665 in a transmitter path via control, e.g. closing, of switch 625. In this path, the LP inductance ($L_{lp,1}$) 662 in parallel with a small high-pass variable (tunable) capacitance ($C_{hp,2}$) 651, say of the order of <0.5 pF, supports a normal duplex case. Alternatively, switch 625 may be opened and the antenna path is solely coupled to high-pass variable (tunable) capacitance 651 to support a reverse duplex transmitter case. Thereafter, the 90 deg. phase shift network at a HP frequency (namely achieved by high-pass variable (tunable) capacitance 651) passes the phase shifted signal to tunable transmit band-pass filter 665 in the transmitter path. In this example, the tunable transmit band-pass filter 665 in the transmitter path is also supplemented with a tunable notch filter 664, with the notch arranged to be at the corresponding receive centre frequency. In this manner, the tunable transmit band-pass filter 665 (bandpass filter response) may be designed in such way as to exhibit relaxed close-in stop band rejection characteristics. Thus, the band-pass filter response of the tunable transmit band-pass filter 665 may be designed to reduce or eliminate noise in the transmitter at the receive frequency, which can be high and may desensitize the receiver due to noise leakage from the transmitter into the receiver.

In some examples, the respective input to the receiver chain and output from the transmitter chain in the aforementioned examples, may employ silicon on insulator (SOI) antenna switch technologies, and in some examples the opening/closing thereof may be controlled by controller 214 of FIG. 2. The example architectures in FIGS. 2-6 may comprise or form part of a radio frequency transceiver module comprising respective transmitter and receiver paths.

Although examples of the invention have been described with respect to band-pass filters located within the front end module, it is envisaged that in other examples any suitable filters may be employed, for example high-pass, low-pass or band-reject (notch) filters.

Although some examples of the invention have been illustrated in the figures with respect to use of tunable RF filters or tunable RF amplifiers, it is envisaged that in other examples any suitable tunable RF component may be employed, dependent for example on the number of transmit or receive paths being supported, the architecture employed or the wireless communication standards supported.

Although examples of the invention have been described with respect to supporting certain wireless communication standards, such as various frequency bands within an LTE system, it is envisaged that in other examples of the invention any wireless communication systems may be supported or any number of wireless communication systems may be supported using multi-mode wireless communication units.

Examples of the invention may therefore provide a simplified (inasmuch as fewer RF components are required) duplexer that comprises a phase shift network topology. Examples of the invention may therefore provide an ability to dynamically reconfigure (e.g. in a real-time manner) one or more lumped element (L, C) components of a phase shift network, and particularly in some examples to switch topology from normal duplex operation to reverse duplex operation. Examples of the invention may therefore provide a saving in a number of components used in a duplexer that comprises a phase shift combiner network, as compared to present day phase shift networks. Furthermore, examples of the invention may provide a saving in the number of duplexers used to support a multi-band platform solution that includes normal and reverse duplex cases.

Figure 7:
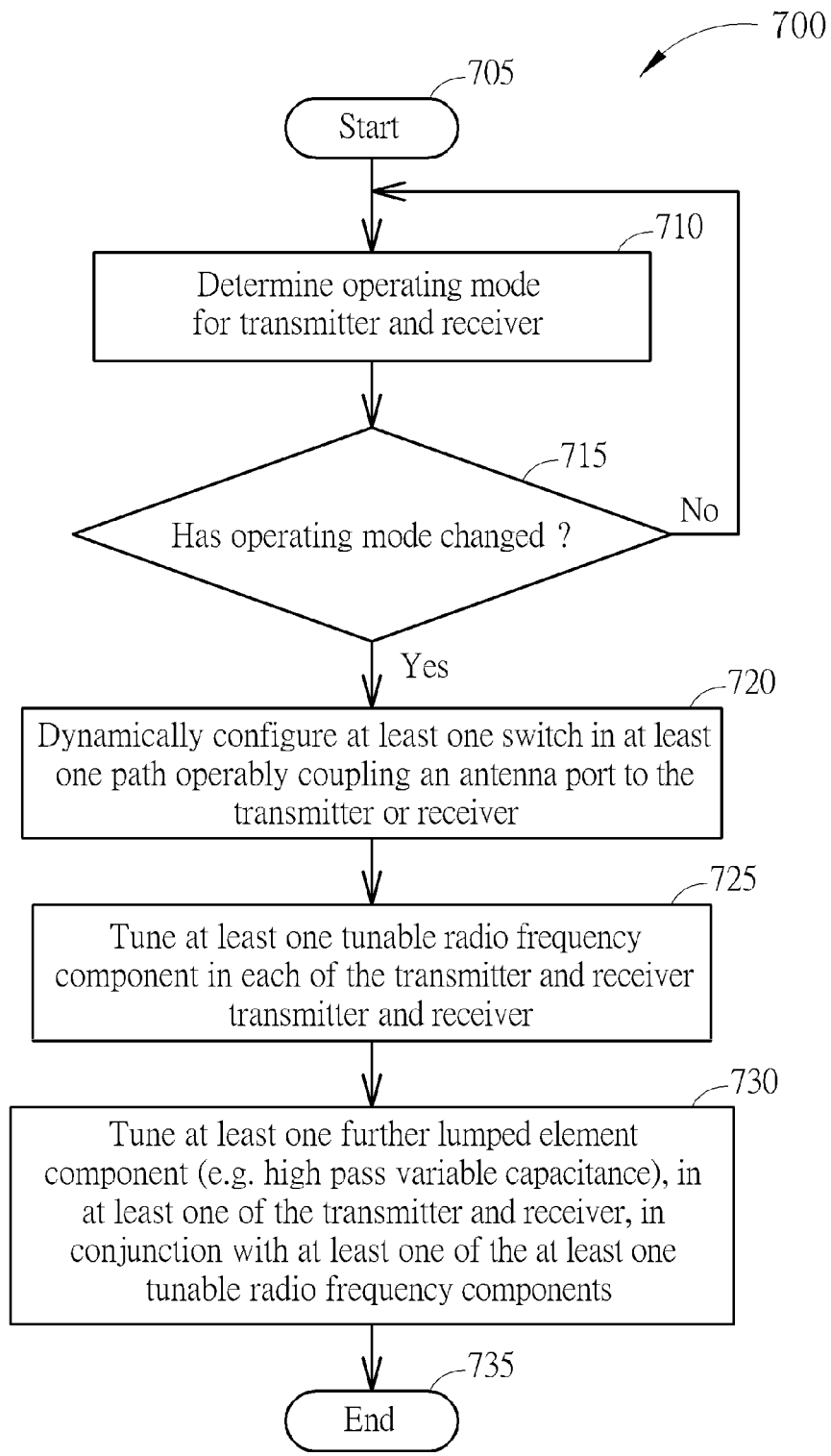
FIG. 7 illustrates an example flowchart of a method of tuning a transceiver of a communication unit that comprises a transmitter and a receiver operably coupled to at least one antenna port via a reconfigurable/tunable phase shift network.

Referring now to FIG. 7, a flowchart 700 illustrates an example method of tuning a transceiver of a communication unit that comprises a transmitter and a receiver operably coupled to at least one antenna port via a reconfigurable (e.g. tunable) phase shift network, for example in accordance with one or more of the aforementioned example circuit arrangements. The flowchart 700 starts at 705 and moves to 710 whereby a determination is made as to a frequency mode of operation for both the transmitter and receiver. In alternative examples, the flowchart may skip this step as the receiver and transmitter may be initially set up in a default position, e.g. a normal mode of operation. A determination is then made in 715 as to whether a frequency mode of operation has changed. If no change of a frequency mode of operation is determined, the process loops, for example back to 710. Otherwise, the flowchart proceeds to 720 whereby at least one switch in at least one path that is operably coupling the at least one antenna port to the transmitter or receiver is dynamically configured in accordance with the determined frequency mode of operation. In 725, at least one tunable radio frequency component in each of the transmitter and receiver is tuned. In 730, at least one further lumped element component, in at least one of the transmitter and receiver, may be optionally tuned in conjunction with at least one of the at least one tunable radio frequency component, for example concurrently and/or based on stored look-up table (LUT) values tied to frequency mode of operation, thereby dynamically reconfiguring a phase to be applied to a signal passing through the reconfigurable phase shift network. The process then ends at 735.

In some examples, some or all of the steps illustrated in the flowchart may be implemented in hardware and/or some or all of the steps illustrated in the flowchart may be implemented in software.

It is envisaged that the aforementioned inventive concept can be applied by a semiconductor manufacturer to any radio frequency module comprising radio frequency components or circuits. It is further envisaged that, for example, a semiconductor manufacturer may employ the inventive concept in a design of a stand-alone radio frequency module or application-specific integrated circuit (ASIC) or may implement the any other sub-system element.

It will be appreciated that any suitable distribution of functionality between different functional units, for example with respect to the components or circuits residing in either the front end module or any transceiver modules, may be used without detracting from the invention. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved wireless communication unit, radio frequency module and method of operation therefor that supports multiple frequency ranges and/or multiple communication standards therefor have been described, wherein the aforementioned disadvantages with prior art arrangements have been substantially alleviated.

What is claimed is:

1. A wireless communication unit comprising:
   at least one antenna port; and
   a transmitter and a receiver operably coupled to the at least one antenna port via a duplexer;
   wherein the duplexer comprises a dynamically reconfigurable phase shift network that comprises:
   at least one tunable radio frequency (RF) component, wherein the at least one tunable RF component comprises a tunable RF filter coupled to one of a receive chain and a transmitter chain of the wireless communication unit; and
   at least one switch operably coupled to the tunable RF component and controllable to reconfigure the dynamically reconfigurable phase shift network in response to duplex modes of operation comprising normal and reverse duplexer modes of operation so as to selectively support both the normal and reverse duplexer modes of operation for RF signals passing there through;
   wherein the at least one switch is controllable to selectively provide at least one signal transmission path between the tunable RF filter and the at least one antenna port in response to the duplex modes of operation; and the tunable RF filter is coupled in series between the at least one antenna port and the one of the receive chain and the transmitter chain in both the normal and reverse duplexer modes of operation.

2. The wireless communication unit of claim 1 wherein the at least one switch is arranged to selectively couple one of at least two paths between the at least one antenna port and the tunable RF component dependent upon a frequency of operation in support of the normal or reverse duplexer mode of operation.

3. The wireless communication unit of claim 1 wherein the at least one switch comprises two switches operably coupled serially to respective inductances and configured to be closed to support a low-pass frequency mode of operation in either the transmitter or the receiver.

4. The wireless communication unit of claim 3 further comprising at least a tunable capacitance located in a parallel path to each of the at least two switches.

5. The wireless communication unit of claim 4 wherein a first tunable capacitance is arranged to support a tunable high-pass frequency response mode of operation in either the transmitter or the receiver and a second tunable capacitance is arranged to support a tunable low-pass frequency response in parallel with one of the respective inductances in the other of the receiver or transmitter.

6. The wireless communication unit of claim 1 wherein the at least one switch comprises at least two switches: a first switch of the at least two switches configured to couple first paths between the antenna port and the transmitter and the antenna port and the receiver to configure the transmitter and receiver for the normal duplex mode of operation; and a second switch of the at least two switches configured to couple second paths between the antenna port and the transmitter and the antenna port and the receiver to configure the transmitter and receiver for the reverse duplex mode of operation.

7. The wireless communication unit of claim 1 wherein the at least one switch comprises at least one of: at least one single-pole multiple-throw antenna switch, a multiple-throw multiple-pole antenna switch.

8. The wireless communication unit of claim 1 wherein the reconfigurable phase shift network comprises a tunable phase response that forms part of both:
a transmitter phase shift network and a tunable transmit RF component; and
a receiver via a receiver phase shift network and a tunable receive RF component.

9. The wireless communication unit of claim 8 wherein a part of the tunable phase shift network comprises a lumped element portion and a portion that resides in the tunable RF component.

10. The wireless communication unit of claim 9 further comprising a controller operably coupled to the transmitter and receiver, wherein a tunable high-pass frequency response and a tunable low-pass frequency response is controlled by the controller configured to tune the first tunable capacitance in combination with a serially coupled tunable transmit radio frequency component, and the second tunable capacitance in combination with respective further serially coupled tunable receive radio frequency component.

11. The wireless communication unit of claim 1 wherein at least one of the tunable RF components comprises at least one from: a tunable band pass filter, a tunable notch filter.

12. A radio frequency module comprising a duplexer that comprises a dynamically reconfigurable phase shift network that comprises:

at least one tunable radio frequency (RF) component, wherein the at least one tunable RF component comprises a tunable RF filter coupled to one of a receive chain and a transmitter chain of the radio frequency module; and at least one switch operably coupled to the tunable RF component and controllable to reconfigure the dynamically reconfigurable phase shift network in response to duplex modes of operation comprising normal and reverse duplexer modes of operation so as to selectively support both the normal and reverse duplexer modes of operation for RF signals passing there through;

wherein the at least one switch is controllable to selectively provide at least one signal transmission path between the tunable RF filter and the at least one antenna port in response to the duplex modes of operation; and the tunable RF filter is coupled in series between the at least one antenna port and the one of the receive chain and the transmitter chain in both the normal and reverse duplexer modes of operation.

13. The radio frequency module of claim 12 wherein the at least one switch is arranged to selectively couple one of at least two paths between at least one antenna port and the tunable RF component dependent upon a frequency of operation in support of the normal or reverse duplexer mode of operation.

14. The radio frequency module of claim 12 wherein the at least one switch comprises two switches operably coupled serially to respective inductances and configured to be closed to support a low-pass frequency mode of operation in either the transmitter or the receiver.

15. The radio frequency module of claim 14 further comprising at least a tunable capacitance located in a parallel path to each of the at least two switches.

16. The radio frequency module of claim 15 wherein a first tunable capacitance is arranged to support a tunable high-pass frequency response mode of operation in either the transmitter or the receiver and a second tunable capacitance is arranged to support a tunable low-pass frequency response in parallel with one of the respective inductances in the other of the receiver or transmitter.

17. The radio frequency module of claim 12 wherein the at least one switch comprises at least two switches: a first switch of the at least two switches configured to couple first paths between the antenna port and a transmitter and the antenna port and a receiver to configure the transmitter and receiver for the normal duplex mode of operation; and a second switch of the at least two switches configured to couple second paths between the antenna port and the transmitter and the antenna port and the receiver to configure the transmitter and receiver for the reverse duplex mode of operation.

18. The radio frequency module of claim 12 wherein the reconfigurable phase shift network comprises a tunable phase response that forms part of both:
a transmitter phase shift network and a tunable transmit RF component; and
a receiver phase shift network and a tunable receive RF component.

19. The radio frequency module of claim 18 wherein a part of the tunable phase shift network comprises a lumped element portion and a portion that resides in the tunable RF component.

20. A method of tuning a transceiver of a communication unit that comprises at least one antenna port; and a transmitter and a receiver operably coupled to the at least one antenna port via a duplexer, wherein the duplexer comprises a dynamically reconfigurable phase shift network, the method comprising:

determining a frequency mode of operation for both the transmitter and receiver;

dynamically configuring at least one switch in at least one path to operably couple the at least one antenna port to the transmitter or receiver in accordance with the determined frequency mode of operation;

tuning at least one tunable radio frequency (RF) component in each of the transmitter and receiver, wherein the at least one tunable RF component comprises a tunable RF filter coupled to one of a receive chain and a transmitter chain of the communication unit;

dynamically configuring the at least one switch to selectively provide at least one signal transmission path between the tunable RF filter and the at least one antenna port in response to duplex modes of operation comprising normal and reverse duplexer modes of operation, wherein the tunable RF filter is coupled in series between the at least one antenna port and the one of the receive chain and the transmitter chain in both the normal and reverse duplexer modes of operation; and further tuning at least one further lumped element component, in at least one of the transmitter and receiver, in conjunction with at least one of the at least one tunable radio frequency component, thereby dynamically reconfiguring the reconfigurable phase shift network in response to the duplex modes of operation so as to selectively support both the normal and reverse duplexer modes of operation for RF signals passing there through.

\* \* \* \* \*